Feb. 23, 1954
O. H. SCHUCK
2,670,455
CONTROL SIGNAL MODIFYING MEANS IN RADIO CONTROLLED FLIGHT
Filed Aug. 6, 1951
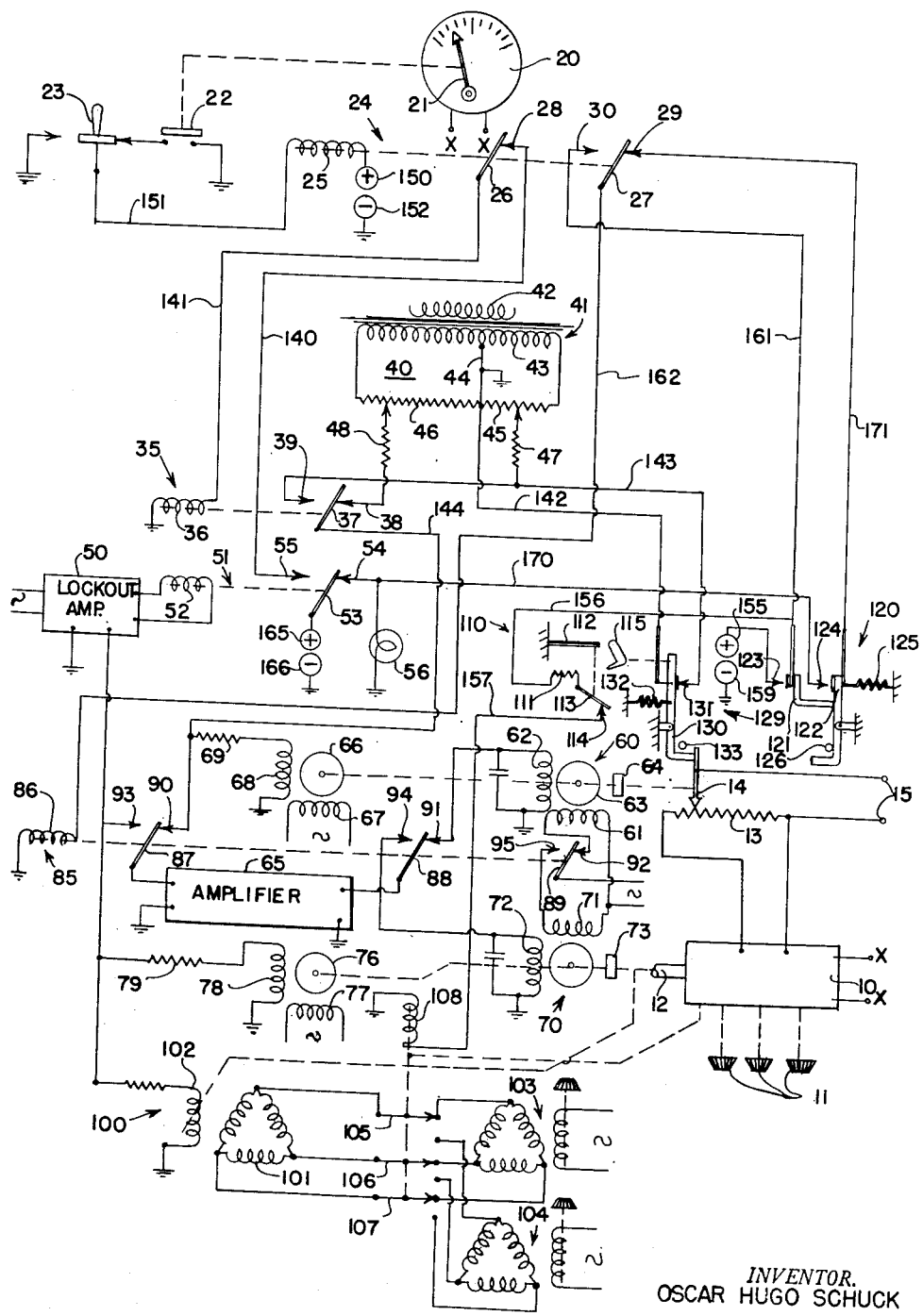
*INVENTOR.*
OSCAR HUGO SCHUCK
BY
George H Fisher
*ATTORNEY*

Patented Feb. 23, 1954

2,670,455

UNITED STATES PATENT OFFICE 2,670,455

CONTROL SIGNAL MODIFYING MEANS IN RADIO CONTROLLED FLIGHT

Oscar Hugo Schuck, Minneapolis, Minn., assignor to Minneapolis-Honeywell Regulator Company, Minneapolis, Minn., a corporation of Delaware Application August 6, 1951, Serial No. 240,597

9 Claims. (Cl. 318—19)

1

The present invention is concerned with an electro-mechanical mechanism for adjusting a control apparatus and rendering the control apparatus ineffective when adjustment is being made. More particularly, the invention is concerned with a change-over mechanism for an electrical control signal producing apparatus wherein it is desired that the output signal of the apparatus be eliminated while adjustment is being made on the control apparatus.

There is disclosed in my copending application, Serial No. 33,608, filed June 17, 1948, an aircraft flight control system wherein an aircraft is automatically controlled to fly along a preselected flight plan comprised of several legs or sections. In this copending application, the control system is arranged to fly the controlled craft along each selected leg and upon the completion of one of these selected legs, the control system is readjusted to cause the craft to fly along the next leg of the flight plan. The present invention is provided to accomplish automatically the change-over or readjustment of the control apparatus upon the completion of the individual legs of the flight plan and to make the readjustment without any sudden variation of the flight controls of the controlled craft.

It is therefore an object of the present invention to provide an automatic change-over mechanism for a control apparatus wherein the output from the control apparatus is modulatingly rendered ineffective while adjustments are being made in the control apparatus.

Another object of the present invention is to provide an automatic change-over mechanism for a control apparatus wherein a control device operates through a first motor to eliminate the output signal from a control apparatus after which a second motor readjusts the control apparatus whereupon the first motor returns the output signal from the control apparatus to normal.

Still another object of the present invention is to provide an automatic change-over control wherein a switching mechanism is operative upon a gain-control device reaching a minimum position to switch in a different controlled variable to the control apparatus.

A further object of the present invention is to provide an automatic change-over mechanism wherein an apparatus output control operates a switch mechanism when a minimum position is reached, which switching mechanism readjusts the control apparatus.

A still further object of the present invention is to provide a change-over control mechanism wherein an output control operates a switching mechanism upon reaching a predetermined position and said switching mechanism is effectively deenergized until the output control moves back to a maximum position wherein the switch

2 mechanism is reconditioned for further operation.

A still further object of the present invention is to provide a change-over mechanism for a control apparatus wherein a first control signal drives a first motor through an amplifier and an output control is driven to a minimum position where a second control signal is connected to the amplifier and the amplifier is in turn connected to a second motor which readjusts the control apparatus; whereupon the first motor drives the output control to a maximum.

These and other objects of the present invention will be understood upon considering the specification and the accompanying drawing.

Referring to the drawing, the numeral 10 represents a combined computer and coupler unit of the type shown in my above mentioned copending application. This unit or control apparatus is shown to have a plurality of manually adjustable control knobs 11 for adjusting the control apparatus in a desired manner. The apparatus is also shown to have an input shaft 12 which is also used to adjust elements within the apparatus 10. The output from the control apparatus 10 is in the form of an electrical signal which is directly applied to the end terminals of a gain control potentiometer 13. This gain control potentiometer has a slider 14 which determines the magnitude of the electrical signal that will appear upon the output terminals 15. The electrical signal on the output terminals 15 may be fed into any suitable automatic pilot apparatus, not shown.

An indicator 20 is arranged to indicate the magnitude of an output signal appearing on terminals X—X of the control apparatus 10 which is not the control signal for the automatic pilot appearing on terminals 15. This indication may be in terms of miles or the like as shown in my above mentioned copending application.

When an indicating needle 21 of the indicator 20 reaches a predetermined position, it is operative to close a control switch 22. This control switch 22 is associated with a manually operated switch 23 of the single pole double throw type. The switch 22 cooperates with the switch 23 to control the energization of a relay 24, which comprises a relay coil 25, a pair of switch blades 26 and 27, normally biased into engagement, when the relay coil 25 is deenergized, with a pair of contacts 28 and 29: when the relay coil is energized, the switch blade 27 engages an associated contact 30.

The relay 24 controls the energization of a transfer relay 35 which comprises a relay coil 36, and a switch blade 37 normally biased into engagement with an associated contact 38, by means not shown, and out of engagement with an associated contact 39. This relay is arranged to select a desired output signal from a signal producing network 40. This signal producing network is energized by a transformer 41 having a primary 42 and a secondary 43 which has a tap at 44. Connected between the tap 44 and the right hand terminal of secondary 43 is a speed selecting potentiometer 45. Connected between the left hand terminal of the secondary 43 and the tap 44 is a further speed potentiometer 46. Connected to the slider of potentiometer 45 is a summing resistor 47 and connected to the slider of potentiometer 46 is a summing resistor 48.

Also controlling the energizing circuit for the transfer relay 35 is a lockout amplifier 50 which is connected in controlling relation to a lockout relay 51. The relay 51 comprises a relay coil 52 and a switch blade 53 normally biased, by means not shown, into engagement with an associated contact 54 and out of engagement with an associated contact 55. A signal indicating lamp 56 is arranged to be energized when the lockout relay 51 is in the deenergized position. The lockout amplifier may be of the type disclosed in my above mentioned application, said type energizing the relay 51 only when there is no input signal therefor.

For adjusting the slider 14 of the gain potentiometer 13, a gain-control motor 60 is provided. This motor 60 is of the two phase reversible type having a line field winding 61 and an amplifier field winding 62. A rotor 63 is arranged to drive the slider 14 through a suitable gear train 64. The motor 60 receives its energizing power from an amplifier 65 which may be of the type shown in the Albert P. Upton patent, 2,423,534, issued July 8, 1947. The gain-control motor 60 also drives a velocity generator or dynamic transformer 66 which has an energizing winding 67 and an output winding 68. The operation of the velocity generator 66 is such that the voltage induced in the secondary winding, for any value of primary voltage, has the same frequency as the primary voltage, and varies in amplitude and reverses in phase with variation in the speed and reversal in the direction of rotation of the rotor. Connected to one end of the output winding 68 is a summing resistor 69. The amplifier 65 is also arranged to energize a change-over motor 70 which is of the two phase reversible type and has a line energizing winding 71 and an amplifier winding 72. This motor 70 is connected to drive the shaft 12 of the control apparatus 10 through a suitable gear train 73. The motor 70 is also arranged to drive a velocity generator 76 similar to velocity generator 66 and having an energizing winding 77 and an output winding 78, the latter of which is connected to a suitable summing resistor 79.

For determining whether the amplifier 65 is to drive the gain-control motor 60 or the change-over motor 70, a change-over relay 85 is provided. This change-over relay comprises a relay coil 86 and a plurality of switch blades 87, 88, 89, normally biased, by means not shown, when the relay coil is deenergized, into engagement with associated contacts 90, 91, and 92 and out of engagement with associated contacts 93, 94, and 95, respectively.

The signal source for the control signal to drive the change-over motor is the control transformer synchro 100 which comprises a three-former synchro 101 and an output winding 102 on winding stator 101 and an output winding 102 on a suitable rotor, not shown, which is arranged to be adjusted by the change-over motor 70. The stator 101 is adapted to be connected to one of a plurality of generator synchros 103 and 104 through stepping switches 105, 106, and 107. These stepping switches are arranged to be moved by a suitable mechanism, not shown, actuated by a stepping relay coil 108.

The stepping coil 108, in addition to operating upon switches 105, 106, and 107, also selects further variables which may be adjusted by manual knobs 11 within the control apparatus 10. The sudden selection of these further variables without a corresponding adjustment of the shaft 12 may cause a large unbalance signal to appear on the potentiometer 13, and it is this unbalance which may cause unduly large changes in the input to the apparatus connected to terminals 15.

The energizing circuit for the stepping relay coil 108 is controlled by a thermal time delay relay 110 which comprises a heater 111 which operates upon a bimetal 112. When the bimetal 112 has been heated for a predetermined length of time a switch blade 113 is moved out of engagement with an associated contact 114 and is latched out of engagement by a suitable latching mechanism 115. This energizing circuit for the stepping relay is also controlled by a "low" gain limit switch assembly 120 which comprises a pivoted switch blade assembly carrying a pair of blades 121 and 122 which are normally biased out of engagement with contacts 123 and 124 respectively by a tension spring 125 which forces the blade assembly against a stop 126 until the slider 14 reaches the low limit position when the blade assembly is rotated and the switch blades and their associated contacts come into engagement.

Actuated when the slider 14 of the gain potentiometer 13 is in the high gain position is a "high" limit switch assembly 129. This assembly comprises a pivoted blade 130 which is associated with a contact 131: when the slider 14 is not in the high gain position, the blade 130 is moved out of engagement with the contact 131 by means of the tension spring 132 and the blade 130 moves into engagement with a stop 133. When the blade 130 is moved into engagement with contact 131, a mechanical connection between the blade 130 and the latch 115 of the thermal time delay relay 110 causes the latch to move to the released position so that the blade 113 of the delay relay can move into engagement with its associated contact 114.

*Operation*

In considering the operation of the present apparatus, assume first that the system is energized and that there has not yet been an indication of a need for a change in the setting of the shaft 12 of the control apparatus 10. Under this assumed set of conditions, the output signal on the winding 102 of the control transformer synchro 100 is zero and this means that the lockout amplifier 50 is maintaining the lockout relay 51 in the energized position, so that switch blade 53 is in an engagement with switch contact 55. The relay 24 will be in a deenergized position as its energizing circuit is not closed. Since the relay 24 is deenergized, the transfer relay 35 is energized through a circuit that may be traced from positive terminal 165 of a power supply connected to switch blade 53, through switch contact 55, conductor 140, switch contact 28, switch blade 26, conductor 141, relay coil 36, and ground back to the negative terminal 166 associated with the blade 53. When the transfer relay 35 is energized, the switch blade 37 engages contact 39.

Inasmuch as there is no energizing circuit for the change-over relay 85, the switch blades associated therewith are in the deenergized position so that blade 87 is engaging contact 90, blade 88 is engaging contact 91 and blade 89 is engaging contact 92. Further, under the assumed conditions, the slider 14 is in the high gain position so that the maximum output signal from the control apparatus 10 is fed to the output terminals 15. When the slider 14 is in the high limit position, the blade 130 of the high limit switch mechanism 129 engages the contact 131 so that the input of amplifier 65 is grounded to prevent any energizing signal from arising on its output to cause any operation of the gain control motor 60. This grounding circuit may be traced from the grounded tap 44 of the secondary 43 through conductor 142, switch blade 130, switch contact 131, conductor 143, contact 39, switch blade 37, conductor 144, switch contact 90, switch blade 87 to the input of amplifier 65. As the switch blade 88 is engaging contact 91 the output from the amplifier, if there is any, is fed directly to the amplifier winding 62 of the motor 60. As the blade 89 is engaging contact 92, the line winding 61 is connected to be energized by a suitable source of alternating power.

Upon an indication of a need for a change in the adjustment of the apparatus 10, the meter 20 will operate to a predetermined position whereupon the switch 22 will be closed. If the manually operated switch 23 is in the right hand position, or the automatic position, the relay 24 is energized through a circuit that may be traced from a positive terminal 150 through the relay coil 25, conductor 151, switch 23, switch 22, and ground back to a negative terminal 152. When the relay 24 becomes energized, the switch blade 26 moves out of engagement with the contact 28 and the switch blade 27 moves out of engagement with the contact 29 and into engagement with the contact 30. The movement of blade 26 interrupts the energizing circuit to the transfer relay 35, and this relay moves to the deenergized position in which its switch blade 37 engages the switch contact 38.

When the transfer relay 35 is deenergized the grounding circuit to the input of amplifier 65 is broken at contacts 39 and 37, and an energizing signal from the network 40 is supplied to the input of the amplifier 65 through a circuit which may be traced from the slider of potentiometer 46 through the summing resistor 48, switch contact 38, switch blade 37, conductor 144, switch contact 90, switch blade 87, to amplifier 65. The phasing of this energizing signal is such as to cause the amplifier 65 to energize the motor 60 in a direction to move the gain potentiometer slider 14 away from its high limit position toward its low limit position. When slider 14 moves from the high limit position, the latch 115 of the thermal time delay relay 110 is reset into its operative position and the blade 130 moves out of engagement with its associated contact 131.

The motor 60 continues to be energized by the amplifier 65 until it has driven the slider 14 into the low limit position: blade 122 engages contact 124 and the blade 121 engages contact 123. Further, the electrical output signal from the apparatus 10 is reduced until there is no control signal appearing upon the output terminals 15.

When the blade 121 engages contact 123, an energizing circuit is established to the relay stepping coil 108 through a circuit that may be traced from a positive terminal 155 through switch contact 123, switch blade 121, conductor 156, heater 111, switch blade 113, contact 114, conductor 157, coil 108, and ground back to a negative terminal 159. Stepping coil 108 operates, a different set of variables is selected in apparatus 10, the associated switches 105, 106, and 107 select the output from the sequentially next synchro generator 104, and the electrical signal from synchro 104 is applied to the control transformer synchro 100. If the position of the output winding 102 of the control transformer synchro 100 is not electrically aligned with that of the rotor of the generator synchro 104, an electrical output signal appears upon winding 102.

Also energized when the blade 121 engages contact 123 in the low limit switching mechanism is the change-over relay 85. The energizing circuit for this relay may be traced from the positive terminal 155 through the switch contact 123, switch blade 121, conductor 161, switch contact 30, switch blade 27, conductor 162, coil 86, and ground back to the negative terminal 159. Upon the energization of the relay 85, the gain-control portion of the apparatus is effectively disconnected from the amplifier 65 and the change-over and adjusting portion of the apparatus is connected thereto. When switch blade 87 engages contact 93, the unbalance signal appearing upon the output winding 102 of the control transformer synchro 100 is applied to the input of amplifier 65. When the switch blade 88 engages contact 94 the output of the amplifier 65 is connected to the amplifier winding 72 of the change-over motor 70. When the switch blade 89 engages contact 95, the alternating current power circuit for the field winding is completed.

Upon the appearance of an unbalance signal on the output winding 102 of the control transformer synchro 100, the lockout amplifier 50 operates to deenergize the lockout relay 51 so that the switch blade 53 will engage contact 54 and signal light 56 is energized through a circuit that may be traced from positive terminal 165 through switch blade 53, contact 54, lamp 56, and ground back to the negative terminal 166.

An unbalance signal is now supplied to the input of amplifier 65 from the output winding 102, and the change-over motor 70 begins to operate, driving the rotor of the control transformer synchro to a position where it no longer supplies an unbalance signal. At the same time the motor 70 also drives the shaft 12 to readjust the control apparatus 10.

It is desirable to interrupt the circuit of coil 108 after the stepping relay has operated, to prevent the coil from overheating. This is accomplished by the current flow through heater 111 of thermal control device 110, which heats the bimetal 112, causing the switch blade 113 to be moved out of engagement with contact 114. The blade is locked in this position by latch 115 until the latch is released when slider 14 reaches its high limit, as described above.

Upon the switching in of a new generator synchro signal readjustment of the shaft 12 of the control apparatus 10 takes place. Indicating instrument 20 responds to this adjustment and opens the contact 22 to deenergize the control relay 24. When the relay 24 becomes deenergized the switch blade 26 moves into engagement with contact 28 and the switch blade 27 engages contact 29. As soon as switch blade 27 engages contact 29, a new maintaining circuit for the change-over relay 85 is established and this circuit may be traced from the positive terminal 165 through the switch blade 53, switch contact 54, conductor 170, switch contact 124, switch blade 122, conductor 171, contact 29, switch blade 27, conductor 162, relay coil 86 and ground back to the negative terminal 166.

When the change-over motor 70 has driven the output winding 102 to a balanced condition there no longer is an output signal upon the winding 102, and the lockout amplifier 50 reenergizes the lockout relay 51. Switch blade 53 moves out of engagement with its associated contact 54 to break the energizing circuit for the change-over relay 85 so that the latter becomes deenergized. The amplifier 65 is reconnected to the gain-control portion of the apparatus so that upon the appearance of an input signal to the amplifier 65 the gain control motor 60 may become operative. When the switch blade 53 engages contact 55 on the lockout relay 51 the energizing circuit for the transfer relay 35 is again established so that this relay becomes energized and the switch blade 37 moves into engagement with contact 39. When blade 37 engages contact 39, a new control signal from the network 40 is applied to the input of amplifier 65 through a circuit which may be traced from the slider of the potentiometer 45 through the summing resistor 47, switch contact 39, switch blade 37, conductor 144, switch contact 90 and switch blade 87 to the input of amplifier 65. The phasing of this alternating signal arising from the network 40 when applied to the input of the amplifier 65 is such that the gain-control motor 60 runs in a direction to move the slider 14 of the gain-control potentiometer 13 to a high limit position or toward the left as it is shown upon the drawing.

As soon as the gain-control motor 60 has moved the slider 14 to the high limit position the high limit switching mechanism 129 is operated and the switch blade 130 becomes engaged with switch contact 131 to effectively connect the input of amplifier 65 to ground to thereby eliminate any control signal on the input thereof and effectively deenergize the gain-control motor 60. When the slider 14 engages the high limit switching mechanism, the blade 130 in rotating in a clockwise direction is effective to release the latching mechanism 115 of the cutout device 110 so that the switch blade 113 may engage contact 114 and condition the apparatus for a further operation upon an indication of a need therefor by the indicator 20.

As yet, no consideration has been given to the effect of the velocity generators 66 and 76 upon the operation of the control apparatus and the change-over mechanism. Each of these velocity generators, 66 and 76, produces an electrical output signal whose phase is dependent upon the direction of rotation of the generator and whose magnitude is dependent upon the speed of rotation of the generator. In the case of the velocity generator 76 which is driven by the change-over motor 70, the output signal is fed into the input of amplifier 65 when the amplifier is controlling the operation of the change-over motor 70 and serves to prevent excessive hunting and overshooting of the change-over motor as it rotates the output winding 102 of the control transformer synchro 100 toward a balanced position.

In the case of the velocity generator 66, this generator when coupled with the input of amplifier 65 functions as a speed regulating device. When the motor 60 is running at the desired speed the magnitude of the control signal from the network 40 and that of the output from the generator 66 are practically the same. The effect of an increase in speed of the gain-control motor 60 is an increase in output from the velocity generator 66 and the phasing of this output is such that it tends to decrease the magnitude of the difference or control signal going into the amplifier 65. This decrease in magnitude of the control signal going into amplifier 65 has the effect of decreasing the speed of the gain-control motor 60. The magnitude of the output signal from the control network 40 can be variably selected by adjusting the potentiometer sliders of the potentiometers 45 and 46. The slider of the potentiometer 46 is generally positioned so as to cause the gain-control motor, when moving the slider 14 from the high limit position toward the low limit position to move at a fairly rapid rate. The slider of the potentiometer 45 is so positioned that the effective control signal from this portion of the network when compared with the output from the velocity generator 66 causes the output from the control motor 60 to drive the slider 14 the gain control motor 60 to drive the slider 14 from the low limit position to the high limit position at a relatively slow rate, so that the output control signal appearing upon the terminals 15 will not increase at a rate greater than it is possible for the control apparatus controlled by the output signal to follow. In other words, in the event that the output signal on terminals 15 is fed to an automatic pilot apparatus, the changing of the craft's attitude is gradual without any unduly rapid change in the operation of the automatic pilot.

From the foregoing it will be seen that there has been provided an automatic change-over mechanism for a control apparatus having an electrical output signal wherein that electrical output signal is eliminated while the changing over of the control apparatus is being accomplished and then the electrical output signal is returned to its new required value at a suitably slow rate after the control apparatus has been adjusted. While the present invention has been partially integrated into the subject matter of my above mentioned copending application, this has been for illustrative purposes only for it will be obvious that the present invention has application in many types of condition control art wherein changes of a condition control apparatus must be made from time to time, and where sudden changes are undesirable. Further, many modifications will be obvious to those skilled in the art and therefore I intend to be limited solely by the scope of the appended claims.

I claim:

1. Apparatus for monitoring the progress of a process in which one or more conditions are to be varied in such a fashion that a first quantity computed therefrom varies according to a schedule made up of a series of portions each of which requires a pre-determinable adjustment of a first adjustable computer element, and in each of which said second quantity varies through a range ending at a fixed value thereof, said apparatus comprising, in combination: the said first computer element; a signal receiver adapted to be connected to a signal transmitter to comprise a balanceable network giving an output according to disagreement between the receiver and the transmitter; means connecting said receiver for adjustment concurrent with adjustment of said first element; a plurality of settable signal transmitters pre-set in accordance with said pre-determinable adjustments of said first element; switching means connected to said receiver and said transmitters for successively completing a plurality of such balanceable networks including said receiver and successive ones of said transmitters; further computer elements including elements adapted for adjustment in accordance with said conditions; means actuated in accordance with the adjustments of said computer elements to give a first output proportional to the first quantity and second output proportional to the second quantity; means, including an attenuator adjustable through a range between a normal condition of minimum attenuation and an operated condition of maximum attenuation, for variably supplying said first output to condition controlling means; motor means for adjusting said first element and said attenuator; means effective when said second output assumes a value corresponding to said fixed value of said second quantity for causing said motor means to adjust said attenuator to said condition of maximum attenuation; first limit control means connected to said first switching means and to said motor means, and actuated when said condition of maximum attenuation is reached, for preventing further adjustment of said attenuator by said motor means, for causing operation of said switching means to substitute the succeeding signal transmitter in said balanceable network, and for causing said motor means to adjust said first element and said signal transmitter in accordance with any unbalance of said network; means connected to said network and responsive to balance thereof to prevent further adjustment of said first element by said motor means and to cause said motor means to adjust said attenuator to said condition of minimum attenuation; and second limit control means connected to said motor means and actuated when said condition of minimum attenuation is reached, for preventing further adjustment of said attenuator or said first element by said motor means.

2. Changeover means comprising in combination: means, including an adjustable element, for supplying a control voltage which is a function of the adjustment of said adjustable element; means, including an attenuator adjustable through a range between a normal condition of minimum attenuation and an operated condition of maximum attenuation, for variably supplying said control voltage to a utilization circuit; motor means for adjusting said element and said attenuator; means normally preventing operation of said motor means; switching means having an operated or change-over initiating condition and a normal or change-over releasing condition; means connected to said switching means and operative in the change-over initiating condition thereof to cause said motor means to adjust said attenuator to said condition of maximum attenuation; first limit control means connected to said motor means and actuated when said attenuator reaches said condition of maximum attenuation to prevent further adjustment of said attenuator by said motor means and to cause said motor means to adjust said adjustable element to a selected value; means actuated when said selected adjustment of said element has taken place to prevent said motor means from further adjusting said adjustable element; means connected to said switching means and operative in the change-over releasing condition thereof to cause said motor means to adjust said attenuator to said condition of minimum attenuation; and further limit control means connected to said motor means and actuated when said attenuator reaches said condition of minimum attenuation to prevent further adjustment of said attenuator by said motor means.

3. Change-over means comprising in combination: means, including an adjustable element, for supplying a control voltage which is a function of the adjustment of said adjustable element; a first motor for adjusting said adjustable element; means including an attenuator adjustable through a range between a normal condition of minimum attenuation and an operative condition of maximum attenuation, for variably supplying said control voltage to a utilization circuit; a second motor for adjusting said attenuator; means normally preventing operation of said motors; switching means having an operated or change-over initiating condition and a normal or change-over releasing condition; means connected to said switching means and operative in the change-over initiating condition thereof to cause said second motor to adjust said attenuator to said condition of maximum attenuation; first limit control means connected to said motors and actuated when said attenuator reaches said condition of maximum attenuation to prevent further adjustment of said attenuator by said second motor and to cause said first motor to adjust said adjustable element to a selected value; means actuated when said selected adjustment of said element has taken place to prevent said first motor means from further adjusting said adjustable elements; means connected to said switching means and operative in the change-over releasing condition thereof to cause said second motor to adjust said attenuator to said condition of minimum attenuation; and further limit control means connected to said second motor and actuated when said attenuator reaches said condition of minimum attenuation to prevent further adjustment of said attenuator by said second motor.

4. Change-over means comprising in combination: an adjustable control device giving an output signal; balanceable telemetric means operable to adjust said device; an adjustable gain control connected to variably attenuate said signal; change-over control means operable upon the occurrence of need for adjusting said device; means actuated by operation of said change-over control means to cause adjustment of said gain control so as to reduce said signal; means connected to said last named means, and including a first limit control actuated by said gain control when said signal is fully reduced, for preventing further adjustment of said gain control and for causing said telemetric means to be balanced, whereupon the need for adjustment of said control device ceases; means connected to said telemetric means and responsive to balance thereof to prevent further adjustment thereof; means actuable by said change-over control means, upon the cessation of said need, to cause adjustment of said gain control so as to restore said signal; and means connected to said last named means and including a second limit control actuated by said gain control when said signal is fully restored, for preventing further adjustment of said gain control.

5. Change-over means comprising in combination: an adjustable control device giving an output signal; balanceable telemetric means operable to adjust said device; an adjustable gain control connected to variably attenuate said signal; change-over control means operable upon the occurrence of need for adjusting said device; change-over means actuated by operation of said change-over means to cause adjustment of said gain control at a first selected rate so as to reduce said signal; means connected to said last named means, and including a first limit control actuated by said gain control when said signal is fully reduced, for preventing further adjustment of said gain control and for causing said telemetric means to be balanced, whereupon the need for adjustment of said control device ceases; means connected to said telemetric means and responsive to balance thereof to prevent further adjustment thereof; means actuated by said change-over control means, upon the cessation of said need, to cause adjustment of said gain control at a second selected rate so as to restore said signal; and means, connected to said last named means, and including a second limit control actuated by said gain control when said signal is fully restored, for preventing further adjustment of said gain control.

6. Change-over means comprising in combination: an adjustable control device giving an output signal; a telemetric receiver connected for adjustment concurrently with said control device; settable telemetric transmitting means adapted for connection to said receiver to comprise a balanceable system giving an output voltage which varies in magnitude and reverses in sense with variation in the amount and reversal in the sense of any unbalance of said system; an adjustable gain control connected to variably attenuate said signal; motor means for adjusting said control device and said gain control; means supplying first and second further output voltages of opposite senses and selectable magnitudes; change-over control means operable upon the occurrence of need for adjusting said device; means connected to said motor means and actuated by operation of said change-over control means to cause said motor means to adjust said gain control, in accordance with said first further output voltage, so as to reduce said signal; a first limit control actuated by said gain control when said signal is fully reduced; means connected to said motor means and said first limit control and rendered operative by actuation of the latter to prevent said motor means from further adjusting said gain control, and to cause said motor means to adjust said control device in accordance with said output voltage of said balanceable system so as to rebalance said system, whereupon the need for adjustment of said control device ceases; means connected to said motor means and said telemetric system and responsive to balance of the latter to prevent said motor means from further adjusting said control device; means actuable by said change-over control means upon cessation of said need, to cause said motor means to adjust said gain control, in accordance with said second further output voltage, so as to restore said signal; a second limit control actuated by said gain control when said signal is fully restored; and means connected to said motor means and said second limit control and rendered operative by actuation of the latter to prevent said motor means for further adjusting said gain control.

7. Means for changing a constant of a computer without adversely affecting apparatus energized by the output of the computer comprising, in combination: a computer including an element to be adjusted to a number of values of a constant, and giving an output signal which varies with changes in at least one variable fed to the computer; an adjustable gain control connected to vary said output signal; motor means for adjusting said element and said gain control; switching means operable to initiate change of the constant of said computer; and sequentially operated means connected to said motor means and said switching means, and including limit control means at each end of the adjustment of said gain control, for first gradually adjusting said gain control to reduce a minimum value and then output signal to a minimum value and then rapidly readjusting said computer element, when said switching means is operated, and to gradually restore the output signal to full value when said switching means is thereafter released.

8. Means for changing a constant of a computer without adversely affecting apparatus energized by the output of the computer comprising, in combination: a computer including an element to be adjusted to a number of values of a constant, and giving first and second output signals which vary with changes in at least one variable fed to the computer, said first output signal reaching a critical value when it is necessary to adjust said element and departing from said critical value when adjustment of said element is begun; an adjustable gain control connected to vary said second output signal; motor means for adjusting said element and said gain control; switching means operated when said first output signal assumes said critical value and released when said first output signal departs from said critical value; and sequentially operative means connected to said motor means and said switching means, and including limit control means at each end of the adjustment of said gain control, for first gradually adjusting said gain control to reduce the second output signal to a minimum value and then rapidly adjusting said computer element, when said switching means is operated, and for gradually restoring the second output signal to full value when said switching means is released by said adjustment of said computer element.

9. Means for changing a constant of a computer without adversely affecting apparatus energized by the output of the computer comprising, in combination: a computer including an element to be adjusted to a number of values of a constant, and giving an output signal which varies with changes in at least one variable fed to the computer; first motor means for adjusting said element; an adjustable gain control to vary said output signal; second motor means for adjusting said gain control; switching means operable to initiate change of the constant of the computer; and sequentially operative means connected to said first and second motor means and to said switching means, and including limit control means at each end of the adjustment of said gain control, for first causing said second motor to gradually adjust said gain control to reduce the output signal to a minimum value and then causing said first motor to rapidly adjust said computer element, when said switching means is operated, and for causing said second motor to gradually restore the output signal to full value when said switching means is thereafter released.

OSCAR HUGO SCHUCK.

No references cited.